United States Patent [19]

Tanaka et al.

[11] Patent Number: 5,602,687
[45] Date of Patent: Feb. 11, 1997

[54] APPARATUS FOR AUTOMATICALLY MUTING THE OUTPUT OF A RECORDING DEVICE DURING RECORDING

[75] Inventors: Masato Tanaka, Tokyo; Kissei Matsumoto, Kanagawa, both of Japan

[73] Assignee: Sony Corporation, Tokyo, Japan

[21] Appl. No.: 176,313

[22] Filed: Jan. 3, 1994

Related U.S. Application Data

[63] Continuation of Ser. No. 825,262, Jan. 24, 1992, abandoned.

[30] Foreign Application Priority Data

Jan. 31, 1991 [JP] Japan .................................. 3-032083

[51] Int. Cl.⁶ .................................................. G11B 15/12
[52] U.S. Cl. ............................................. 360/61; 360/62
[58] Field of Search .................................. 360/69, 12, 62, 360/66, 67, 68, 46, 32, 61, 31; 455/212, 215

[56] References Cited

U.S. PATENT DOCUMENTS

| | | | |
|---|---|---|---|
| 4,366,513 | 12/1982 | Satoh et al. | 360/66 |
| 4,605,975 | 8/1986 | Beaman | 360/62 |
| 4,955,010 | 9/1990 | Nabeshima et al. | 360/78.04 |

FOREIGN PATENT DOCUMENTS 58-224488  12/1983  Japan .

Primary Examiner—Andrew L. Sniezek
Attorney, Agent, or Firm—Jay H. Maioli

[57] ABSTRACT

An apparatus for preventing a digital audio tape recorder from transmitting signals to an external device during recording by selectively interrupting the output signal from the digital audio tape recorder by a control device which produces a muting signal when a record signal and a muting detection signal are present at the same time.

1 Claim, 3 Drawing Sheets

APPARATUS FOR AUTOMATICALLY MUTING THE OUTPUT OF A RECORDING DEVICE DURING RECORDING

This is a continuation of application Ser. No. 07/825,262 filed Jan. 24, 1992 now abandoned.

BACKGROUND OF THE INVENTION

This invention relates to a signal recording apparatus, and more particularly is suitable to be adapted to, for example, a compact rotary head type digital audio tape recorder.

In a conventional rotary head type digital audio tape recorder (DAT) of this kind, a line input terminal 2 for inputting an audio signal from an external device to a DAT 1 is provided and a line output terminal 3 from which an audio signal is outputted to the external device is provided, as shown in FIG. 1.

Therefore, by connecting a line output terminal 6 of, for example, a cassette tape recorder with radio receiver 5 and the line input terminal 2 of the DAT 1 through a line cord 8 and connecting a line input terminal 7 of the cassette tape recorder with radio receiver 5 and the line output terminal 3 of the DAT 1 through a line cord 9, it is possible to send radio broadcasting received by the cassette tape recorder with radio receiver 5 to the DAT 1 through the line cord 8 for recording it in the DAT 1 or to output a reproduced sound from the DAT 1 from a speaker of the cassette tape recorder with radio receiver 5 through the line cord 9 by making the DAT 1 in a reproduction mode and outputting an audio signal on the line output terminal 3.

A recording and/or reproducing apparatus such as the DAT 1 and the cassette tape recorder with radio receiver 5 has, in general, a construction in which, when it is controlled to a line input mode, the audio signals inputted from the line input terminals 2 and 7 are outputted from the line output terminals 3 and 6, respectively, as they are, so that the audio signals outputted from the line output terminals 3 and 6 can be monitored by user.

Accordingly, when the DAT 1 is made to a line input recording mode while the cassette tape recorder with radio receiver 5 being controlled to a line input mode so as to monitor the recording sound of the DAT 1 by means of the speaker of the cassette tape recorder with radio receiver 5, an audio signal inputted from the Line input terminal 2 of the DAT 1 is gradually amplified by a loop formed by the line output terminal 3 of the DAT 1, the line cord 9, the line input terminal 7 of the cassette tape recorder with radio receiver 5, the line output terminal 6, the line cord 8 and the line input 2 of the DAT 1, causing an oscillation phenomenon to occur and so there was a problem that rasping oscillation sound is produced from the speaker of the cassette tape recorder with radio receiver 5.

As one method for solving this problem, it may be considered to disconnect the line cord 9 when the DAT 1 is made to the line input recording mode or other methods such as switching the line input mode of the cassette tape recorder with radio receiver 5 to another mode, etc., may be considered, however, when such method is employed, there is a problem that it is impossible to avoid user's troublesome handling and, so, it was not yet enough as solution.

SUMMARY OF THE INVENTION

In view of the foregoing, an object of this invention is to provide a signal recording apparatus capable of more easily and reliably preventing oscillation phenomenon.

The foregoing object and other objects of the invention have been achieved by the provision of a signal recording apparatus having output means 16 for outputting an output signal S6 to an external device 5, when it is controlled to a recording state, the output signal S6 outputted from the output means 16 is controlled to an output stop state.

By not outputting the output signal S6 from the output means 16 when the recording apparatus 10 is controlled to the recording state, it is possible to not form such loop as producing the oscillation phenomenon between the said recording apparatus 10 and the external device 5, to thereby not produce rasping sound due to oscillation phenomenon.

The nature, principle and utility of the invention will become more apparent from the following detailed description when read in conjunction with the accompanying drawings in which like parts are designated by like reference numerals or characters.

BRIEF DESCRIPTION OF THE INVENTION

Preferred embodiments of this invention will be described with reference to the accompanying drawings.

Figure 2:
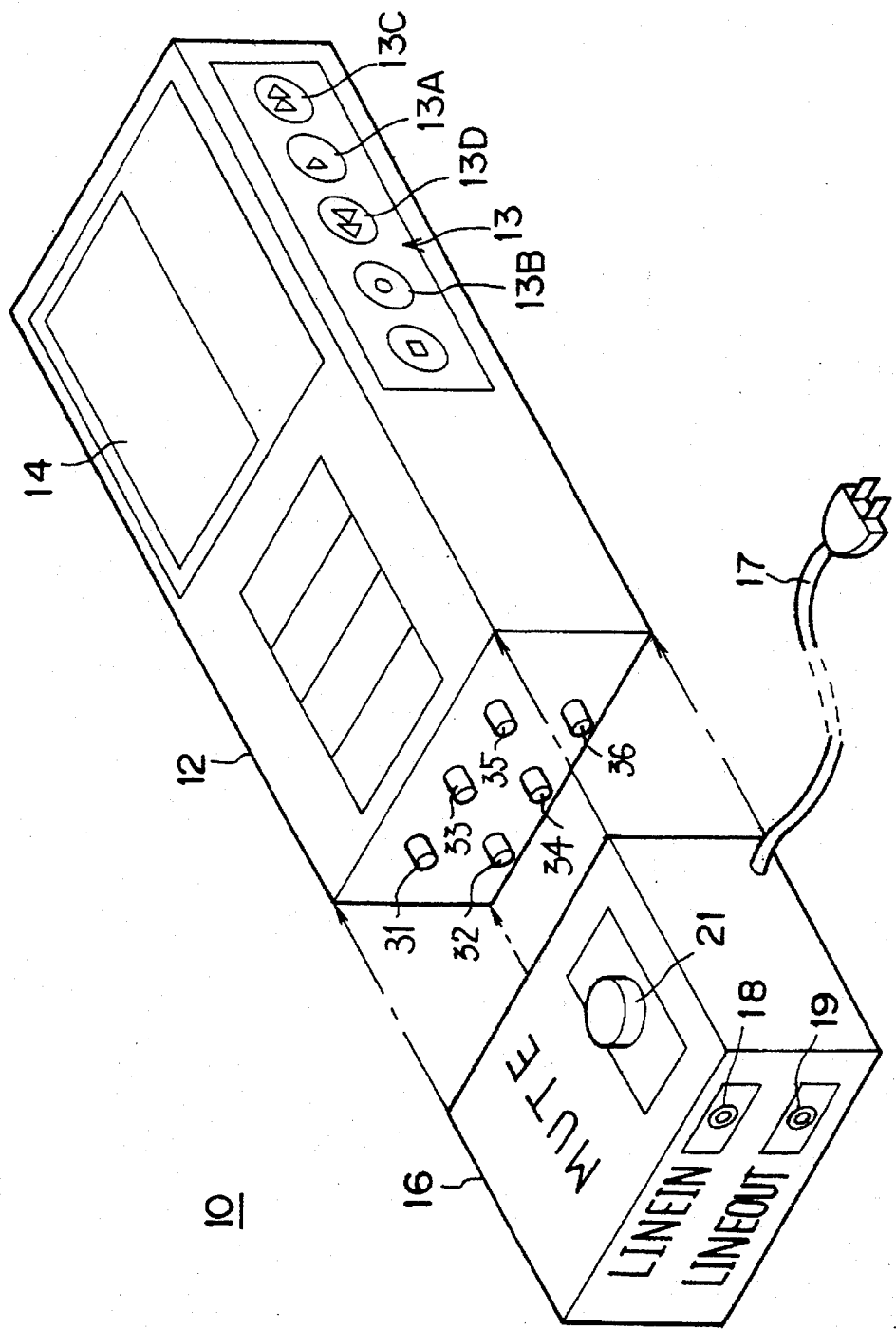
FIG. 2 is a perspective view showing a signal recording apparatus according to the present invention.

FIG. 2 shows a DAT 10 as a whole. By operating a reproduction switch 13A, a recording switch 13B, a fast feed switch 13C or a rewind switch 13D of an operation switch set 13 provided in a body 12 of the DAT 10, the DAT 10 is set to a reproduction mode, a recording mode, a fast feed mode or a rewind mode, respectively. According to the setting mode, an audio signal is reproduced from or recorded on a magnetic tape of a tape cassette loaded in a tape cassette loading portion Further, a line input and output adapter 16 is connected to the body 12 of the DAT 10, and, if the reproduction switch 13A or the recording switch 13B of the body 12 of the DAT 10 is switched on when the line input and output adapter 16 is connected, the body 12 of the DAT 10 is controlled to a line output reproduction mode or a line input recording mode, The line input and output adapter 16 is further provided with a power source input circuit for receiving an external power source, so that, while the line input and output adapter 16 connected to the body 12 of the DAT 10, the external power source can be supplied to the body 12 of the DAT 10 through a power source cord 17.

The line input and output adapter 16 is further provided with a muting switch 21, and it is made to not output an output signal through the line output terminal 19 in the recording mode by on-operating the said muting switch 21.

Figure 3:
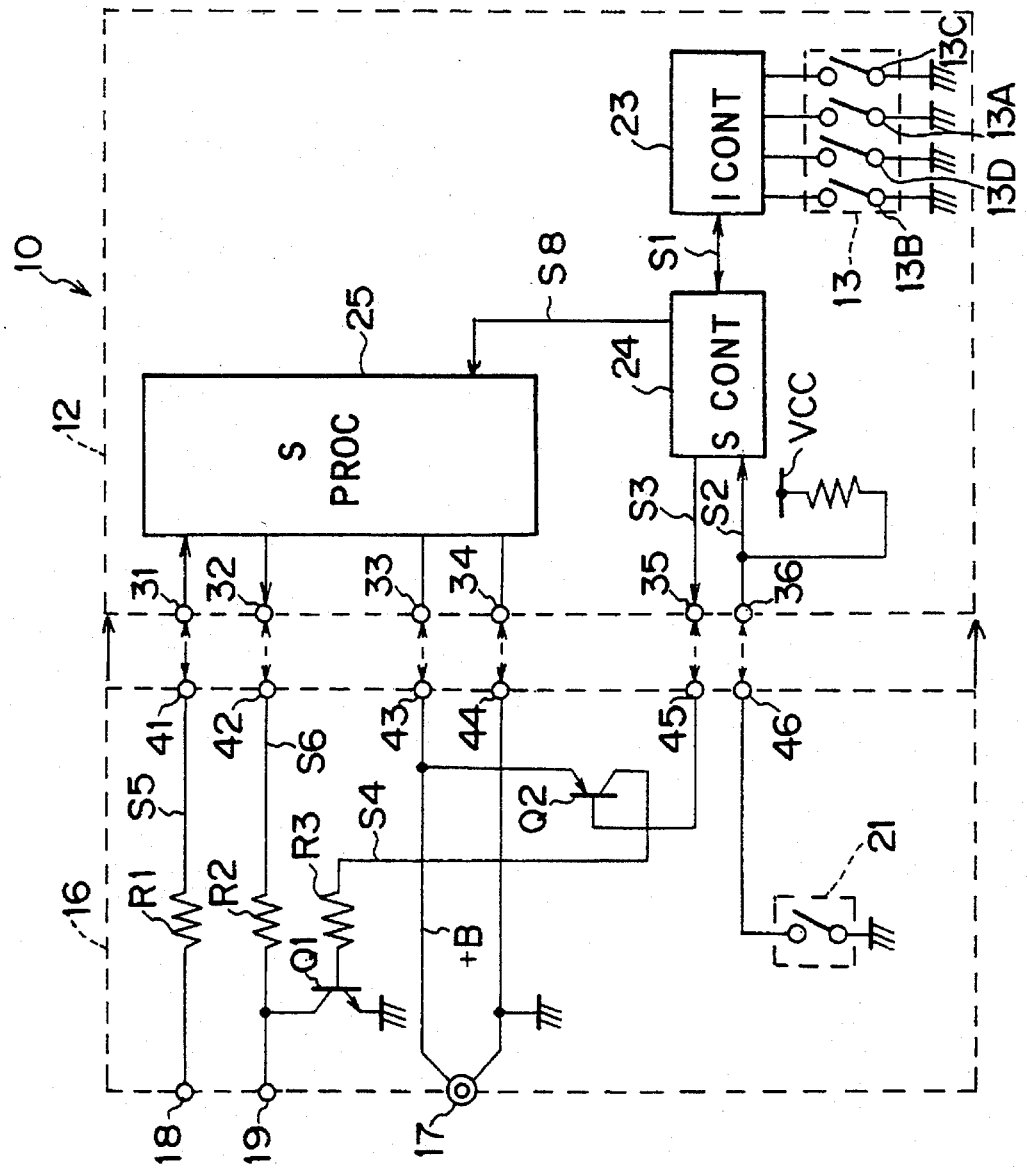
FIG. 3 is a block diagram of an embodiment of the recording apparatus according to the present invention.

As shown in FIG. 3, in the DAT 10, the operation switch set 13 of the body 12 of the DAT 10 is connected to an input control circuit 23, and a control signal S1 corresponding to a key switch operated by the user is sent to a system control circuit 24 of a micro computer construction.

When the reproduction switch 13A is switched on the system control circuit 24 sends a control signal S8 for controlling to the reproduction mode to signal processing circuit 25 to output a reproduced signal from the magnetic tape through a connecting terminal 32 of the body 12 of the DAT and through a connecting terminal 42, a resistor R2 and the line output terminal 19 of the line input and output adapter 16 as an output audio signal S6.

On the other hand, when the recording switch is switched on, the system control circuit 24 takes an input audio signal S5 inputted through the line input terminal 18 of the line input and output adapter 16 which is supplied to the signal processing circuit 25 through a resistor R1 and connecting terminals 41, 31, and records this signal after conversion into a recording signal.

Further, a power source input (+B) inputted through the line input and output adapter 16 is supplied to the signal processing circuit 25 through connecting terminals 43 and 33.

Here, to the system control circuit 24, a power source VCC is connected to a detection input end for detecting a state of the muting switch 21 of the line input and output adapter 16. While the muting switch 21 is in an off state, a detection signal S2 inputted to the said detection input end rises to "H" level and, when the muting switch 21 is in an on state, the detection signal S2 goes down to "L" level.

Further, the system control circuit 24 is made such that a muting control signal S3 goes down to "L" level only when the muting switch 21 is switched on causing the detection signal S2 to be at the "L" level and the recording switch 13B is switched on to set the DAT 10 in the recording mode.

The muting control signal S3 is made inputted to base of PNP transistor Q2 through connecting terminals 35 and 45 and the transistor Q2 switches on when the muting signal S3 goes down to the "L" level and thereby supplies the power source input (+B) to a base of a NPN transistor Q1 through a resistor R3 to thereby operate the transistor Q1 on.

Accordingly, the output audio signal S6 outputted through the connecting terminals 32 and 42 from the signal processing circuit 25 of the body 12 of the DAT 10 flows through the resistor R2 and the transistor Q1 to ground, so that the audio signal S6 is controlled such that it is not outputted from the line output terminal 19.

By controlling the output audio signal S6 by using the multi-stage transistors Q1 and Q2 at this point, it is made that there is no distortion of the output audio signal S6 produced.

Figure 1:
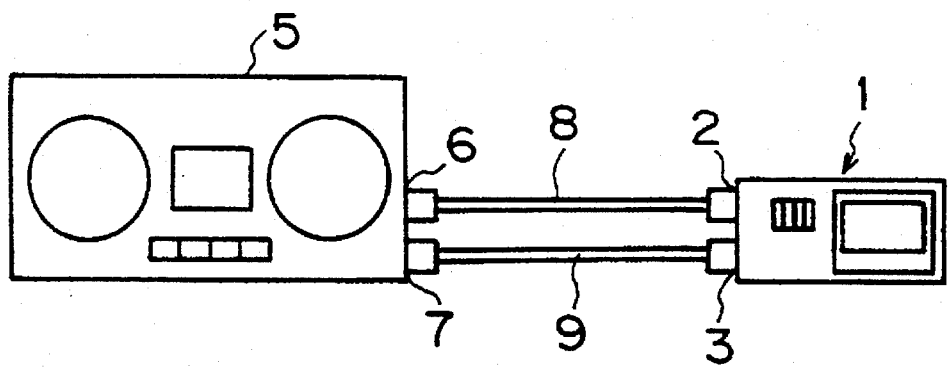
FIG. 1 is a schematic diagram showing a conventional example.
Figure 4:
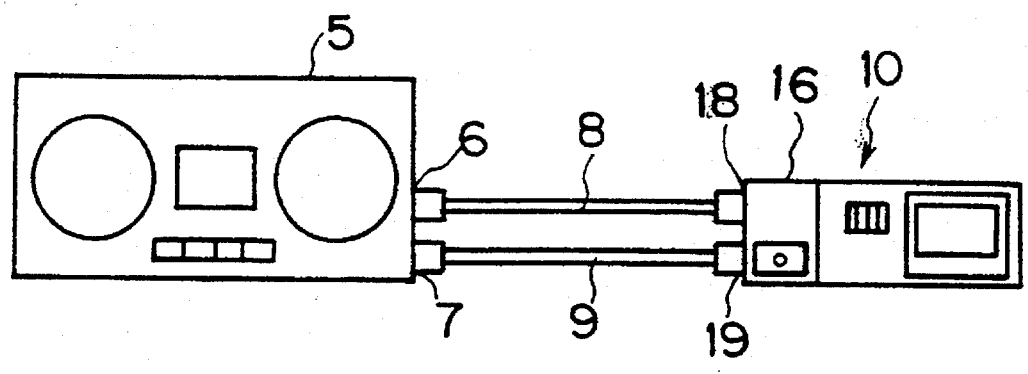
FIG. 4 is a schematic diagram showing a connection between the signal recording apparatus according to the present invention and an external device.

In the construction mentioned above, where the line output terminal 6 of the cassette tape recorder with radio receiver 5 is connected to the line input terminal 18 of the line input and output adapter 16 through the line cord 8 and the line input terminal of the cassette tape recorder with radio receiver 5 is connected to the line output terminal 19 of the line input and output adapter 16 through the line cord 9, as shown in FIG. 4, when the muting switch 21 of the line input and output adapter 16 is switched on to record, in the DAT 10, radio broadcasting received in the cassette tape recorder with radio receiver 5 is supplied to the DAT 10 through the line cord 8, it is possible to control the DAT 10 such that the input audio signal S5 inputted from the line input terminal 18 is not outputted from the line output terminal 19 even if the signal is outputted to the side of the line input and output adapter 16 through the signal processing circuit 25 as the output audio signal S6, since the muting switch 21 is switched on and the recording switch 13B of the DAT 10 is simultaneously switched on.

Accordingly, since, even if the cassette tape recorder with radio receiver 5 is in the line input mode state, there is no loop including the output terminal 19 of the DAT 10, the line cord 9, the line input terminal 7 of the cassette tape recorder with radio receiver 5, the line output terminal 6, the line cord 8 and the line input terminal 18 of the DAT 10 formed, such generation of oscillation phenomenon as in the conventional device can be avoided.

On the other hand, in the reproduction mode, it is possible to output the reproduced output audio signal S6 by setting the muting control signal S3 to the system control circuit 24 (FIG. 3) to the "H" Level even if the muting switch 21 is switched on.

When an audio device constructed such that, in the line input mode, an audio signal inputted from the line input terminal is not outputted through the line output terminal as it is, is connected instead of the cassette tape recorder with radio receiver 5, it is enough to switch off the muting switch 21 of the line input and output adapter 16, in which case, it is possible to monitor a state of sound recorded in the DAT 10 by means of a speaker on the side of the audio device.

According to the above mentioned construction, it is possible to control the output audio signal S6 such that it is not outputted from the line output terminal 19 only when the recording mode is detected, by switching on the muting switch 21, by which it is possible to avoid generation of oscillation phenomenon between the DAT 10 and an external device (the cassette tape recorder with radio receiver 5 in this embodiment) and to not generate rasping sound from the speaker of the external device without requiring user's troublesome operations such as switching operations of mode switching switches of the external device.

Although, in the above described embodiment, the case where the audio signal from the external device is recorded has been described, the present invention is not limited thereto and can be applied widely to a recording of audio signal inputted by various input means such as a recording of a signal from an external microphone, etc.

Further, although, in the embodiment mentioned above, the present invention has been described as applied to the digital audio tape recorder, the present invention is not limited thereto and is applicable to various other audio tape recorders.

In addition, although, in the embodiment mentioned above, the present invention has been described as applied to the recording and reproducing apparatus for recording an audio signal, the present invention is not limited thereto and is applicable widely to various other recoding apparatus for recording other signals.

As described, since, according to the present invention the output means does not provide any output signal when controlled during the recording state, it is possible to realize a recording apparatus capable of doing not generate oscillation phenomenon between an external device.

While there has been described in connection with the preferred embodiments of the invention, it will be obvious to those skilled in the art that various changes and modifications may be made therein without departing from the invention, and it is aimed, therefore, to cover in the appended claims all such changes and modifications as fall within the true spirit and scope of the invention.

What is claimed is:

1. A digital audio tape recorder/player receiving recording signals supplied thereto from an external source, said digital audio tape recorder/player having a line input recording mode in which the recording signals are supplied by said digital audio tape recorder/player as an output signal for monitoring by a user, the external source having an input terminal connected to receive the output signal from said digital audio tape recorder/player for listening thereto by the user, comprising:

output interruption means for selectively interrupting a supply of the output signal from said digital audio tape recorder/player to the input terminal of the external source, said output interruption means including switch means for switching a path of the output signal from said digital audio tape recorder/player to ground and thereby causing interruption to the supply of the output signal to the external source;

a record key switch for producing a record key signal corresponding to a record mode of said digital audio tape recorder/player;

a muting switch for supplying a muting signal indicating a desired interruption of the supply of the output signal from said digital audio tape recorder/player to the external device; and control means for receiving the record key signal and the muting signal, and producing a muting control signal for controlling said output interruption means to interrupt the supply of the output signal from said digital audio tape recorder/player to the external source in accordance with a presence of both the record key signal and the muting signal, the output signal not being interrupted if the muting signal indicates the desired interruption during playback.

* * * * *